June 24, 1930.  A. S. HOWELL  1,767,850
LENS STRUCTURE
Filed Dec. 3, 1928
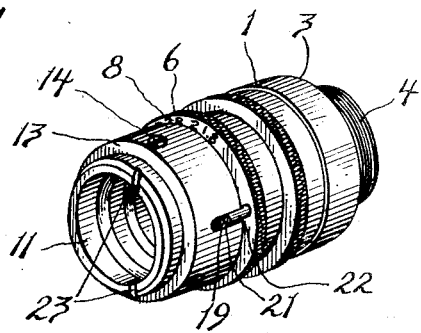
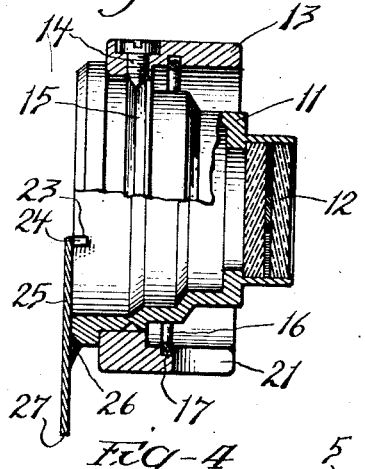
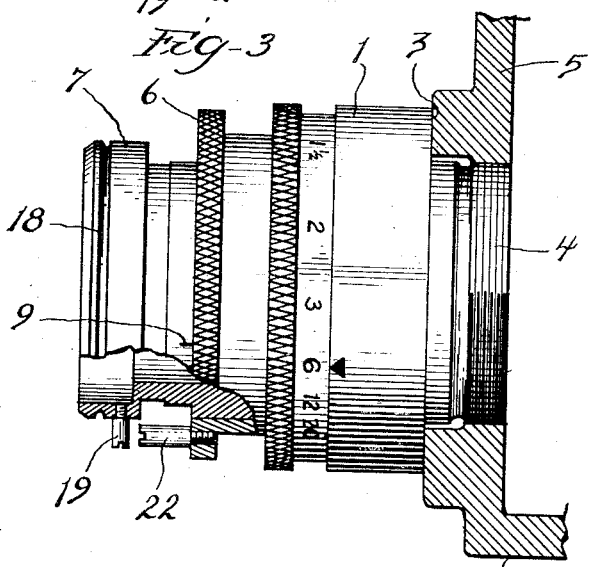
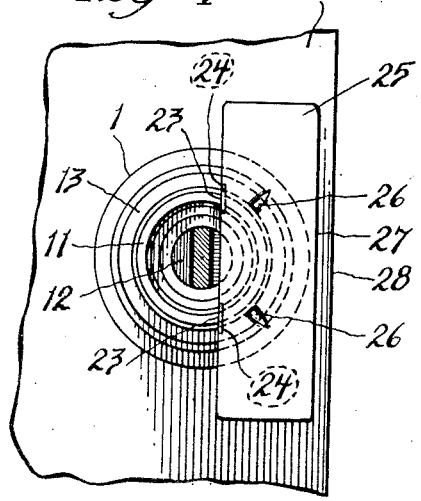
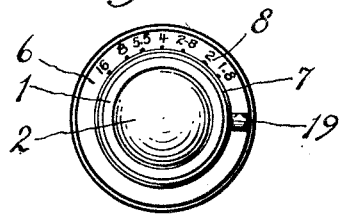
Inventor:—
Albert S. Howell
By:— Miehle & Miehle,
Atty's.

Patented June 24, 1930

1,767,850

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

LENS STRUCTURE

Application filed December 3, 1928. Serial No. 323,225.

My invention relates particularly to photographic lenses which are used in the taking of motion pictures in color although not limited to this use alone.

The general object of my invention resides in the provision of an effective and desirable lens structure in which one carrier, say a color filter carrier, is conveniently removably mountable on another carrier, say a photographic lens carrier, in a predetermined angular position with respect thereto, and which preferably prevents adjustment of an adjustable diaphragm mechanism of the second mentioned carrier out of a predetermined position and which is well adapted to photographic lens structures of standard construction, particularly for the converting of the same for the taking of motion pictures in color in cooperation with a certain type film.

With this object in view my invention consists in certain features of novelty in the construction, combination and arrangement of parts by which the said object and certain other objects, hereinafter appearing, are effected, all as fully described with reference to the accompanying drawing, and more particularly pointed out in the appended claims.

In the said drawing,—

Figure 1 is a perspective view of a photographic lens structure embodying my invention;

Figure 2 is a partial section of the removable portion of the structure and showing the setting gauge, hereinafter described, applied thereto;

Figure 3 is a side elevation of the photographic lens part of the structure attached to a motion picture camera casing and with parts broken away and shown in section;

Figure 4 is a front elevation of the device attached to a motion picture camera casing and showing the setting gauge applied; and Figure 5 is a front elevation of the photographic lens part of the structure.

Like characters of reference indicate like parts in the several views.

Referring to the drawing, 1 designates a photographic lens carrier of conventional barrel form in which is carried a usual photographic lens 2. See Figures 1, 3 and 5. The rear end of this carrier is reduced to form a shoulder 3 and is screwthreaded, as designated at 4, for the mounting of the carrier in the light opening of a motion picture camera casing 5, all as is usual. See Figures 1 and 3.

The carrier 1 is provided with an adjustable diaphragm mechanism, of usual construction, not shown, which mechanism is inclusive of an exterior angularly movable adjusting ring 6, which is disposed rearwardly adjacent a cylindrical formation 7 at the front end of the carrier 1. This ring is provided with a scale 8 for cooperation with an index mark 9 on the carrier for predeterminately adjusting the diaphragm mechanism, all as is usual. See Figures 1, 3 and 5.

Another carrier 11, carrying, as shown, a color filter 12 comprising sections of different colors, is removably mountable upon the front end of the carrier 1 in a predetermined angular position thereon, in the following manner.

A bored mounting member 13 is engaged, by means of the forward portion of its bore, upon the carrier 11 for angular movement with respect thereto, and screws 14 are screwthreaded through the mounting member 13 in angularly spaced relation and are engageable in an annular groove 15 on the carrier 11 for securing the member 13 in angularly adjusted position on the carrier 11. See Figures 1 and 2.

The member 13 is engageable, with its bore, on the cylindrical end formation 7 of the carrier 1 for the removable mounting of the carrier 11 on the carrier 1, as shown in Figure 1. A spring ring 16 is carried in an internal annular groove 17 on the mounting member 13 and is releasably engageable in another annular groove 18 on the cylindrical formation 7 for releasably securing said mounting member on this cylindrical formation. See Figures 2 and 3.

The cylindrical formation 7 is provided with an exterior radial stud 19 which is engageable with an open ended axially extending slot 21 on the member 13 for angularly positioning the member 13 on the carrier 1, and consequently for angularly positioning the carrier 11, secured in angularly adjusted position with respect to the member 13 by means of the screws 14, on the carrier 1. See Figures 1, 2 and 3.

Thus, the carrier 11 is removably mountable upon the carirer 1 in a predeterminately adjusted angular position with respect thereto, for the purpose in the case of the filter 12 of predeterminately angularly positioning the filter with the sections thereof extending longitudinally of a motion picture film of a certain type in the casing 5 for cooperation therewith in the taking of motion pictures in color.

The hereinbefore mentioned adjusting ring 6 of the adjustable diaphragm mechanism has a greater diameter than that of the cylindrical formation 7, and is provided with a stud 22 which extends axially and forwardly from the front face thereof and is engaged by the slot 21 of the mounting member 13 for preventing adjustment of the diaphragm mechanism out of a predetermined position when the carrier 11 is mounted on the carrier 1, so that the proper adjustment of the diaphragm mechanism is assured while the filter is mounted on the carrier, it being observed that the studs 19 and 22 are disengageable with the slot 13 to permit removal of the carrier 11 and its mounting member 13 from the carrier 1.

Thus, it will be observed that the proper angular position of the carrier 11, once adjusted by means of the screws 14, is assured and that the proper diaphragm adjustment of the diaphragm mechanism is also assured without depending upon the operator.

Further, the construction is particularly adapted to photographic lens structures of standard construction as exemplified by the carrier 1 and the diaphragm adjustment ring 6 thereon.

As before described, the carrier 1 is mounted on the camera casing 5 by means of the screwthreaded end 4 and shoulder 3 thereof, a standard mounting. See Figure 3. Accordingly the angular position of the carrier 1 with respect to the camera casing and the photographic element therein, such as a film, cannot be determined until the carrier is mounted on the casing.

Accordingly, the carrier 11 is adjustably positioned angularly with respect to the mounting member 13, by means of the screws 14, after the carrier 1 is mounted on the casing 5.

In order to facilitate the proper angular adjustment of the carrier 11, the front end of the carrier 11 is provided with a slot formation 23 across the front thereof which is engageable with spaced lugs 24 of a gauge 25 for angularly positioning the gauge thereon, the gauge also being provided with angularly spaced projections 26 engageable with the circumference of the carrier 11 to prevent displacement of the gauge longitudinally of the slot formation 23. See Figures 2 and 4.

The gauge 25 is provided with a sighting edge 27 adapted to be sighted on a side 28 of the camera casing 5, when the carrier 11 is mounted on the carrier 1, for determining the proper adjustment of the carrier 11, the edge 27 lying in parallelism with the side 28 when the carrier 11 is properly adjusted as shown in Figure 4.

After the carrier 11 is properly adjusted the screws 14 are tightened to fix the carrier 11 with the mounting member 13.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with an optical element, carrier, of a bored mounting member engaged with its bore on said carrier and angularly movable with respect thereto and removably engageable over a front end cylindrical formation of a photographic lens carrier for the mounting of said first mentioned carrier thereon, and releasable means for securing said mounting member in angularly adjusted position on said first mentioned carrier, said mounting member being provided with an open ended axially extending slot for angularly positioning said first mentioned carrier with said second mentioned carrier.

2. In a device of the character described the combination with an optical element carrier provided with an exterior annular groove, of a bored mounting member engaged with its bore on said carrier and angularly movable with respect thereto and removably engageable over a front end cylindrical formation of a photographic lens carrier for the mounting of said first mentioned carrier thereon and provided with an internal annular groove, screws screwthreaded radially through said mounting member in angularly spaced relation and engageable in said annular groove on said first mentioned carrier for securing said mounting member in angularly adjusted position on this carrier, and a spring ring engaged in said internal annular groove on said mounting member for releasably securing the mounting member on said cylindrical formation, said bored member being provided with an open ended axial slot for angularly positioning said bored member on said cylindrical formation.

3. In a device of the character described the combination with an optical element carrier, of a second carrier, and means whereby said second carrier is removably mountable in a predeterminately adjusted angular position on said first mentioned carrier including a positioning element on one of said carriers and adjustable with respect thereto and means for securing said positioning element in adjusted position on its carrier.

4. In a device of the character described the combination with an optical element carrier, of a second carrier, a mounting member on said second carrier and angularly movable with respect thereto and removably engageable on said first mentioned carrier for the mounting of the second carrier on said first mentioned carrier, means for securing said mounting member in angularly adjusted position on said second carrier, and means for angularly positioning said mounting member on said first mentioned carrier and permitting removal thereof.

5. In a device of the character described the combination with an optical element carrier provided with a cylindrical formation, of a second carrier, a bored mounting member engaged with its bore on said second carrier and angularly movable with respect thereto and removably engageable on said cylindrical formation for the mounting of said second carrier on said first mentioned carrier, means for securing said mounting member in angularly adjusted position on said second carrier, and means for angularly positioning said mounting member on said first mentioned carrier including engageable positioning elements on said cylindrical formation and said mounting member and disengageable with axial removing movement thereof.

6. In a device of the character described the combination with an optical element carrier provided with cylindrical end formation, of a second carrier provided with an external annular groove, a bored mounting member engaged with its bore on said second carrier and angularly movable with respect thereto and removably engageable on said cylindrical formation for the mounting of said second carrier on said first mentioned carrier, means including a screw screwthreaded radially through said mounting member and engageable in said annular groove on said second carrier for securing said mounting member in angularly adjusted position on said second carrier, and an exterior radial stud on said cylindrical formation, said mounting member being provided with an open ended axially extending slot engageable with said stud for angularly positioning said mounting member on said first mentioned carrier.

7. In a device of the character described the combination with an optical element carrier provided with a cylindrical end formation having an external annular groove thereon, of a second carrier provided with an external annular groove, a bored mounting member engaged with its bore on said second carrier and angularly movable with respect thereto and removably engageable on said cylindrical formation for the removable mounting of said second carrier on said first mentioned carrier and provided with an internal annular groove, screws screwthreaded radially through said mounting member in angularly spaced relation and engageable in said annular groove on said second carrier for securing said mounting member in angularly adjusted position on said second carrier, means for releaseably securing said mounting member on said cylindrical formation comprising a spring ring carried in the annular groove on one thereof and releasably engageable in the annular groove on the other thereof, and an exterior radial stud on said cylindrical formation, said mounting member being provided with an open ended axially extending slot engageable with said stud for angularly positioning said mounting member on said first mentioned carrier.

8. In a device of the character described the combination with an optical element carrier having a cylindrical end formation and provided with an adjustable diaphragm mechanism including an exterior angularly movable adjusting ring disposed inwardly adjacent said cylindrical formation and having a diameter greater than that of said cylindrical formation, of a second carrier provided with a bored formation engageable over said cylindrical formation for the removable mounting of said second carrier thereon, an exterior radial stud on said cylindrical formation, and an axially extending stud on said ring, said mounting member being provided with an open ended axially extending slot engageable with said studs.

9. In a device of the character described the combination with an optical element carrier provided with an adjustable diaphragm mechanism, of a second carrier, a mounting member on said second carrier and angularly movable with respect thereto and removably engageable on said first mentioned carrier for the mounting of said second carrier on said first mentioned carrier, means for securing said mounting member in angularly adjusted position on said second carrier, and means associated with said mounting member for positioning said second carrier angularly with respect to said first mentioned carrier and for preventing adjustment of said diaphragm mechanism out of a predetermined position and permitting removal of said second carrier.

10. In a device of the character described the combination with an optical element carrier having a cylindrical end formation and provided with an adjustable diaphragm mechanism including an exterior angularly movable adjusting ring disposed inwardly adjacent said cylindrical formation and having a greater diameter than that of said cylindrical formation, of a second carrier, a bored mounting member engaged with its bore on said second carrier and angularly movable with respect thereto and removably engageable on said cylindrical formation for the mounting of said second carrier on said first mentioned carrier, means for securing said mounting member in angularly adjusted position on said second carrier, an exterior radial stud on said cylindrical formation, and an axially extending stud on said ring, said mounting member being provided with an open ended axially extending slot engageable with said studs.

11. In a device of the character described the combination with an optical element carrier, of a second carrier, means whereby said second carrier is removably mountable in a predeterminately adjusted angular position thereon including a positioning element on one of said carriers and adjustable with respect thereto and means for securing said positioning element in adjusted position on its carrier, said second carrier being adapted for predeterminately positioning a gauge thereon for determining the proper angular position of said second carrier.

12. In a device of the character described the combination with a photographic lens carrier provided with a rearwardly disposed screwthread and shoulder for the mounting thereof upon a photographic camera, a second carrier, and means whereby said second carrier is removably mountable in a predeterminately adjusted angular position on said photographic lens carrier including a positioning element on one of said carriers and adjustable with respect thereto and means for securing said positioning element in adjusted position on its carrier, said second carrier being adapted for predeterminately positioning a gauge thereon adapted to be sighted on the camera for determining the proper angular position of said second carrier.

13. In a device of the character described the combination with a photographic lens carrier of cylindrical formation provided with a rearwardly disposed screwthread and shoulder for the mounting thereof upon a photographic camera, a second carrier, a bored mounting member engaged with its bore on said second carrier and angularly movable with respect thereto and removably engageable over the front end of said lens carrier for the mounting of said second carrier thereon, releasable means for securing said mounting member in angularly adjusted position on said second carrier, and means for angularly positioning said mounting member on said lens carrier and permitting removal thereof, said second carrier being provided with a slot formation across the front end thereof for the predeterminate positioning of a gauge thereon adapted to be sighted on the camera for determining the proper angular position of said second carrier.

In witness whereof I hereunto affix my signature this 21st day of November, 1928.

ALBERT S. HOWELL.